3,256,184
MOLYBDENUM - CONTAINING PHOSPHOSULFU-
RIZED HYDROCARBON, METHODS FOR ITS
PREPARATION, AND ITS USE IN LUBRICANTS
Gary L. Harting, Westfield, Harold N. Miller, Plainfield,
Arnold J. Morway, Clark, and Rudolph Kassinger,
Westfield, N.J., assignors to Esso Research and Engineering Co., a corporation of Delaware
No Drawing. Filed Oct. 8, 1963, Ser. No. 314,649
9 Claims. (Cl. 252—327)

This invention relates to a molybdenum-containing product, methods of preparing said product and compositions containing said product. Particularly, the invention relates to a product prepared from a molybdenum-containing material and a phosphosulfurized hydrocarbon. The resulting product contains a relatively large amount of molybdenum, and has good antiwear properties which makes it particularly useful in the formation of oil compositions, especially lubricants.

*The molybdenum-containing product*

More specifically, the product of the present invention involves preparing a molybdenum complex in a solution, e.g., an aqueous solution, from an inorganic acid and molybdic acid or a molybdenum salt, extracting the resulting complex with an extraction agent, e.g., a ketone or ether, dispersing the extract in a phosphosulfurized hydrocarbon (usually an oil solution of the phosphosulfurized hydrocarbon will be used) and evaporating the extraction agent. The resulting product will generally contain about 0.1 to 10 wt. percent, preferably 1 to 8 wt. percent molybdenum, and is particularly useful for addition to lubricating oil compositions to impart wear reducing properties and as stabilizing agents for less soluble metal salts. Optionally, before the extraction agent is removed, the dispersion can be treated with hydrogen sulfide to sulfurize the molybdenum. In either case, the complex that is formed probably contains a number of molybdenum compounds, such as molybdenum blue and molybdenum oxides.

Among the molybdenum salts that may be used in preparing the product are included ammonium molybdate, sodium molybdate, potassium molybdate, barium or magnesium molybdate and molybdates of other metals such as zinc and cadmium. As has been stated, molybdic acid may be used also. It is likewise possible to employ molybdenum trioxide ($MoO_3$) by dissolving it in aqueous ammonia followed by treatment with hydrochloric acid whereby, in essence, the $MoO_3$ is first converted to ammonium molybdate.

The inorganic acids that can be used include the mineral acids such as hydrochloric acid, sulfuric acid, phosphoric acid, and nitric acid. Hydrochloric acid is preferred because it complexes with the molybdenum to form compounds which are more easily extracted into organic media.

The extraction agent should preferably be: water-insoluble since the complex will usually be prepared in an aqueous solution, capable of extracting the molybdenum from the acidified aqueous solution, compatible with an oil solution of phosphosulfurized polyolefin, and if the mixture of extract and surfactant is treated with $H_2S$, it should not unduly deposit molybdenum sulfide from solution. Ketones of at least 4 carbon atoms satisfy these requirements, and ketones having as many as 10 carbon atoms may be used. Those ketones that are particularly useful include methyl isobutyl ketone, methyl isoamyl ketone, and methyl hexyl ketone. The use of mixed ketones is also contemplated. Ethers are also useful as the extraction agent and those which can be used include ethers of 3 to 16, preferably 3 to 10, total carbon atoms such as diethyl ether, ethyl methyl ether, di-isopropyl ether, di-n-butyl ether, ethyl isopropyl ether, ethyl isobutyl ether, di-n-amyl ether, methyl propyl ether, heptyl methyl ether, etc.

The oil useful to form the solution of phosphosulfurized polyolefin will generally be a mineral oil, e.g., mineral lubricating oil, although synthetic oil including polysilicones, Ucon oils, ester oils, e.g., di-2-ethylhexyl sebacate, etc., can be used.

The phosphosulfurized hydrocarbons are well known. While petroleum bright stock can be phosphosulfurized and then used in this invention, generally a phosphosulfurized polyolefin will be used. The latter material is well known and is usually prepared by reacting phosphorus pentasulfide ($P_2S_5$) with a polymer of a monoolefin, e.g., an alpha olefin, having 2 to 6 carbon atoms, said polymer generally having a molecular weight in the range of 500 to 4,000 Staudinger, preferably 700 to 1,400 Staudinger, for about 0.5 to 15 hours at 150° to 600° F. Phosphosulfurized polybutene is particularly preferred. Preparation of these phosphosulfurized polyolefins are more fully described in U.S. Patent 2,875,188. The phosphosulfurized hydrocarbon can be used per se, or it can be first hydrolyzed. Hydrolyzation is readily carried out by treating the phosphosulfurized hydrocarbon with steam to thereby increase its acidity. This hydrolyzation technique and its products are also well known in the art.

The usual procedure followed in practicing the invention is as follows: Molybdic acid or molybdate may be dissolved in an amount of water that will generally range from 2 to 20, preferably 4 to 10, parts by weight of water per part of molybdate or molybdic acid. Then sufficient mineral acid, e.g., aqueous HCl, may be added to enhance the solubility and extractability of the molybdenum compound by furnishing a solution having a normality in the range of 2 to 12, preferably 6 to 10. Alternatively, the molybdate is dissolved in the previously prepared water-acid mixture. If the acidity is greater than 10 normal, a common ion effect represses the extraction of the molybdenum, while if it is below about 2 normal, the molybdenum utilization, i.e., the proportion of molybdenum in the product to the molybdenum used in the process, tends to be poor. The solution is then extracted with the extraction agent, preferably a ketone. After a period of agitation for proper contact with the extraction agent and then a period of settling for separation, the extract layer is added to the phosphosulfurized hydrocarbon which will usually be dissolved in an oil solution.

Generally the extraction step and the phosphosulfurized hydrocarbon contacting step will be conducted at temperatures in the range of from about 40° to about 150° F., although temperatures outside this range are not excluded. The preferred temperature range is from about 50° to about 120° F.

Following the contacting step, the extraction agent may be removed by heat and vacuum, or by heat and inert gas blowing, nitrogen being a suitable inert gas. If desired,
} prior to extraction agent removal, the mixture of extract and phosphosulfurized hydrocarbon is given an $H_2S$ treat by blowing it with a stream of hydrogen sulfide at a temperature in the range of about 50° to 120° F. for sufficient time to convert at least some of the molybdenum to the sulfide. Thereafter the extraction agent and unreacted $H_2S$, as well as any water that is present, can be removed by heating and by purging with inert gas. For high boiling extraction agents, e.g., certain ketones, vacuum may be applied as a substitute for, or as an added step to, the inert gas purge. The final stripping temperature will depend somewhat on the ketone used and may reach 400° F. For example, a final temperature of 350° F. with nitrogen purge has been used in the case of methyl isobutyl ketone.

While the preparation of the complexes may be done in a batch process, a continuous process may also be used wherein each of the steps will be conducted in a separate zone. The aqueous layer obtained during the separation step following the ketone extraction step may be recycled to the zone where molybdate is mixed with mineral acid. Also the ketone that is removed during the stripping operation may be reused in the process.

In the extraction step the ratio of extraction agent to aqueous solution will ordinarily be within the range of 0.1 to 10, preferably 0.5 to 2, volumes of extraction agent per volume of aqueous mixture. Extraction may be conducted in a single stage or in multiple stages. Countercurrent extraction may also be used.

*Lubricant compositions containing the molybdenum-containing product*

Lubricants, fluid, semi-fluid and greases, can be made using the molybdenum-containing product as an antiwear agent, which are useful for a variety of purposes. A preferred use of said product is in preparing lubricants for lubrication of the cylinders of marine diesel engines.

In lubricating marine diesel engines, a fluid or semi-fluid lubricant is sprayed or forced directly onto the cylinder upon each stroke of the piston by means of a centralized force-feed lubrication system. The lubricant is to a large extent consumed during each stroke of the piston, thereby requiring continuous application of the lubricant. The lubricant should have a fluid, or semi-fluid, consistency to permit the lubricant to be readily pumped through the centralized forced-feed lubrication system and to evenly spread or wet the piston and cylinder. Another requirement of marine diesel cylinder lubricants is that they have good antiwear properties as prevention of wear is very important due to the giant size of the pistons and cylinders and high cost of replacement of liners and other worn parts. The lubricant should also be heat stable so that it does not unduly gel or thicken when moving through hot feed lines or when it hits the surface of the hot cylinder.

Lubricants for such marine diesel lubrication, which met the preceding requirements, have been made by thickening mineral lubricating oil with mixed calcium salts of acetic acid and an intermediate molecular weight fatty acid, e.g., $C_7$ to $C_{12}$ fatty acids. In these prior lubricants, the calcium acetate salt primarily provided the antiwear properties, while the intermediate molecular weight fatty acid salts served primarily as stabilizing agents for maintaining the calcium acetate suitably suspended in the oil. Due to the short chain length of the intermediate fatty acid salts, their suspending power for the calcium acetate is not as great as desired, with the occasional result that some separation of oil and salt occurred in storage and in use. This separation can lead to plugged lines and valves, and loss of antiwear properties due to loss of active ingredient. Furthermore, the particle size of the calcium acetate was frequently larger than desired for maximum stability. Attempts to improve the stability of the prior calcium acetate type marine diesel lubricants with soaps of high molecular weight fatty acids, e.g., $C_{16}$–$C_{18}$ acids, resulted in much better stability but tended to undesirably increase the viscosity of the lubricant.

It has now been found that said prior marine diesel lubricants made from intermediate molecular weight fatty acid and acetic acid, can be improved by simply adding the molybdenum-containing product of the invention. However, even better lubricants can be prepared by using a combination of high molecular weight fatty acid and the molybdenum-containing phosphosulfurized hydrocarbon product, in place of part, or all, of the intermediate molecular weight fatty acid. This use of high molecular weight fatty acid in combination with the surfactant effect of the molybdenum-containing product due to the $P_2S_5$ treated hydrocarbon, can result in a calcium acetate type lubricant of exceptional stability, and wherein the particle size of the calcium acetate is very small. This small particle size allows easy filtration of the fluid lubricant to remove unreactive contaminants (e.g., silica and aluminum oxide, from commercial lime). The filtered products are clear, bright and show no haze. If the bulk of the dehydration of the lubricant is carried out in the presence of free acidity, the molybdenum-containing phosphosulfurized hydrocarbon additive is believed to remain more active with regard to its surfactant effect in suspending calcium acetate so that a more fluid lubricant results and formation of less desirable carbonates is minimized. On the other hand, prior attempts to manufacture prior cylinder lubricants from lime while using acetic and intermediate fatty acid, while dehydrating the lubricant on the acid side, (e.g., heating at 225° to 350° F.) resulted in undesirably viscous and solid products. Also, the combination of ingredients of this invention permits forming lubricants superior to said prior intermediate fatty acid type lubricants in having a reduced tendency to gel under hot conditions. This is important in engines which operate at very high temperatures, where gelling of the lubricant will interfere with the spreading of the lubricant onto the piston and cylinder, and will also interfere with pumping the lubricant through hot, narrow diameter, feed lines.

The higher molecular weight fatty acid that can be used in the present invention to form marine diesel cylinder lubricants, includes $C_{14}$ to $C_{30}$, preferably $C_{14}$ to $C_{22}$ fatty acids. While only saturated fatty acids can be used, the unsaturated acids are preferred. Such preferred fatty acids will include tallow fatty acids, oleic, palmitoleic, gadoleic, erucic, arachidonic, myristoleic acid, etc. These fatty acids are usually derived from either animal or vegetable sources. In some cases, commercial fatty acid derived from naturally occurring materials will contain both saturated and unsaturated acid. For example, some commercial fatty acids will contain about 40 or even 60 wt. percent of saturated fatty acids, with the remainder being principally mono-unsaturated fatty acid along with minor amounts of polyunsaturated fatty acid. Trace amounts of lower fatty acid may also be present. These mixed saturated and unsaturated fatty acid materials will usually have Wijs iodine numbers of about 35 to 110, preferably 40 to 80, and saponification numbers of 250 to 150, preferably 225 to 175 mg.KOH/gm.

Acetic acid or its anhydride is preferred in making marine diesel lubricants. However, other low molecular weight fatty acids such as propionic, and butyric can be used.

Intermediate molecular weight $C_6$ to $C_{13}$ fatty acids such as capric, caprylic, $C_8$ Oxo, lauric acid, etc., can also be used.

Usually calcium is used as the metal component of the diesel lubricant, but other alkaline earth metals including barium, strontium, and magnesium can be used. Usually, the acids are neutralized in the presence of the molybdenum-containing phosphosulfurized hydrocarbon with alkaline earth metal base, e.g., a hydroxide, oxide or carbonate. Lime (calcium hydroxide) is preferred.

The oil component of the lubricant is preferably mineral lubricating oil, although synthetic lubricating oils such as Ucon oils, ester oil, polycarbonate oils, polysilicone oil, etc., can be used.

In general, the lubricants of the invention will comprise a major proportion of lubricating oil and sufficient molybdenum-containing additive to incorporate about 0.01 to 1.0 wt. percent molybdenum in the lubricant. The lubricant can also contain alkaline earth metal salt of about 3.0 to 20.0 wt. percent fatty acid as thickener and for load-carrying. Lubricants of this latter type suitable for lubrication of marine diesel engine cylinders will generally contain salt of about 3.0 to 10.0 wt. percent of fatty acid, and sufficient molybdenum-containing product to incorporate about 0.01 to 0.2 wt. percent molybdenum. However, for purposes of economy, concentrates containing salt of 10 to 40 wt. percent, usually 25 to 35 wt. percent of the fatty acid (and a corresponding proportion of molybdenum-containing phosphosulfurized polyolefin) will be first prepared and then later diluted with additional oil to form the final lubricant of the invention. These concentrates can also be used as soft greases for general use.

The fatty acid salt is preferably formed by coneutralizing, in at least a portion of the oil, about 5.0 to 50, preferably 6 to 35 mole equivalent proportions of the lower fatty acid, e.g., acetic acid or acetic anhydride, per mole equivalent of the higher $C_6$ to $C_{30}$ fatty acid. Thus, the composition, or concentrate, can be prepared by neutralizing the fatty acid in the presence of oil and the acidic phosphosulfurized hydrocarbon with the alkaline earth metal base, followed by dehydration. If the higher fatty acid is principally $C_{14}$ to $C_{30}$ unsaturated fatty acid, then this dehydration is preferably carried out in two steps—the first dehydration step being on the acid side. This is done by initially utilizing an amount of base insufficient to react with all the acid present, e.g., 80 to 99 wt. percent of the base required for complete neutralization is used in this initial stage. After dehydrating on the acid side, the lubricant can be made neutral or slightly alkaline by a second stage reaction involving the addition of a small additional amount of metal base, followed by further dehydration to evaporate the water of reaction of this resulting second neutralization. By this two stage process, a more fluid stable final product can be obtained. In the case of marine diesel lubricants, it is frequently desirable that the final product have a slight alkalinity in order to better neutralize corrosive acids formed by the combustion of the fuel oil used in the engine, for example, sulfuric acid formed by the burning of sulfur present in the low cost residual fuel oils commonly used to power marine diesel engines.

Good results have been obtained by carrying out the first stage of the neutralization such that the free acidity during the dehydrating step is equivalent to about 0.5 to 3.0 wt. percent as oleic acid, based on the total weight of the concentrate. The second stage dehydration is preferably carried out while the product is neutral or has a slight alkalinity, e.g., 0.05 to 0.3 wt. percent as free sodium hydroxide, based upon the weight of the concentrate.

For marine diesel use, the lubricant is preferably prepared by dehydrating in steam-heated kettles at 250° to 350° F. For use as a grease, the lubricant can be dehydrated at higher temperatures, e.g., 350° to 500° F., which higher temperatures will tend to increase gelling of the lubricant.

Generally, if the alkalinity of the final lubricating composition is increased too much, the storage stability of the liquid or semi-fluid compositions, as measured by centrifuge solids, decreases. However, for some applications, final liquid or semi-fluid lubricants having base numbers of about 60 or more, according to ASTM D-664 can be obtained, which are very stable, by a pre-centrifuging of the lubricant concentrate during its manufacture. Thus, by making an alkaline concentrate, then centrifuging the concentrate before it is further blended with additional oil to form the finished lubricant, the less stably suspended salts are removed from the concentrate. At the same time, by centrifuging the concentrate, the total volume of material requiring centrifuging is much less than if it was attempted to centrifuge the more dilute liquid finished lubricant.

It will be understood that various minor modifications of the preceding procedure can be utilized without departing from the inventive scope of the invention. For example, preformed alkaline earth metal salt of $C_2$ to $C_4$ fatty acid, and/or preformed alkaline earth metal salt of the aforesaid higher fatty acid component can be added to the oil and heated together with the molybdenum-containing phosphosulfurized hydrocarbon. Or the molybdenum-containing phosphosulfurized hydrocarbon can be added to the composition after the in situ neutralization of $C_2$ to $C_4$ fatty acid and the higher fatty acid.

Alkaline earth metal salts and soaps of other acids can also be incorporated in the final product, including salts of inorganic acids such as phosphoric acid, nitric acid, hydrochloric acid, etc. These salts and soaps can be formed during the neutralization steps previously noted, by neutralizing the corresponding acid with the alkaline earth metal base.

Various additives can be added to the finished lubricant in amounts of 0.1 to 10.0 wt. percent based on the weight of the finished lubricant. Among additives that can be added are corrosion inhibitors such as sodium nitrite, lanolin, wool grease stearine; antioxidants such as phenyl $\alpha$-naphthylamine; auxiliary extreme pressure agents; auxiliary antiwear agents; dyes; etc.

To further improve stability to water contamination as well as further minimizing gelling tendencies at high temperatures, small amounts of various surface active agents, including those of the type normally used as lubricating oil detergent additives can be added to the final composition, usually in amounts of about .1 to 5.0 wt. percent. For example, the previously described phosphosulfurized polyolefin can be used. Other useful additives are amino alkyl phenols such as those described in U.S. Patents 2,353,491; 2,459,112 and 3,036,003. A particularly preferred material of this type is prepared by reacting nonyl phenol with ethylene diamine and para formaldehyde. Another recently developed surface active agent is polyisobutylene succinic anhydride wherein the polyisobutylene group has a molecular weight of about 700 to 1,200, as well as polyamine derivatives thereof, namely amic acids and imides obtained by condensing polyamines, for example tetraethylene pentamine, with said aforesaid polyisobutylene succinic anhydride. Another surface active material is alkaline earth metal petroleum, or synthetic, alkyl aryl sulfonates of about 300 to 700 molecular weight.

The invention will be further understood by reference to the following examples which include a preferred embodiment of the invention.

EXAMPLE I 75 grams of molybdic acid was dissolved in a mixture of 225 grams of water and 268 grams of 12 normal hydrochloric acid. The resulting acidified solution was then extracted in a separatory funnel with 613 grams of methyl hexyl ketone as the extraction agent. The ketone extract was then added to an oil solution consisting of 94 grams of a phosphosulfurized polybutene dissolved in 281 grams of a mineral lubricating oil, said oil having a viscosity of 150 S.U.S. at 100° F. The resulting mixture was then stirred for about two hours. The ketone was then removed by vacuum stripping at temperatures up to 370° F. under 28" mercury vacuum. The resulting stripped residue was the product and when analyzed contained about 6.1 wt. percent molybdenum.

The phosphosulfurized polyisobutylene in said oil solution was prepared by reacting polyisobutylene of about 800 Staudinger molecular weight with 15 wt. percent $P_2S_5$, based on the weight of the polyisobutylene, at about 425° F. for about 8 hours under a nitrogen atmosphere.

A lubricant was prepared using the product of Example I as follows in Example II.

EXAMPLE II

*Preparation of concentrate.*—A mixed salt concentrate was prepared having the following formulation wherein all percents are weight percents:

16.0% Glacial acetic acid
2.5% Tallow fatty acid of 195 Sap. No. and 55 Iodine No.
3.0% Product from Example I.
10.2% Hydrated lime
0.2% Phenyl α-naphthylamine
68.1% Mineral lubricating oil of 80 S.U.S. viscosity at 210° F.

The oil, the bulk of the hydrated lime, the tallow fatty acids and the molybdenum-containing phosphosulfurized polyisobutylene product of Example I, were added to a steamjacketed grease kettle. The kettle contents were heated mildly to 125° F. for about 30 minutes during which time they were mixed and homogenized by passage through a Charlotte colloidal mill having a 0.003-inch opening. While mixing and homogenizing, the acetic acid was slowly added to the kettle to keep the temperature below 210° F. The resulting composition was then heated to a temperature of 320° F. which required about 3 hours. Free acidity determination at this point showed 2½ wt. percent, based on the kettle contents, as free acidity calculated as oleic acid. The mixture was then further heated while continuing mixing to 330° F., which temperature was held for 30 minutes. At the end of this time, the free acidity had dropped to 2.0% as oleic acid. A small amount of additional lime as a 40 wt. percent lime slurry in mineral lubricating oil (80 S.U.S. at 210° F.) was added to neutralize the free acidity and to give a free alkalinity as 0.16 wt. percent NaOH. The mixture was then cooled to 250° F. where the phenyl-alpha-naphthylamine was added. The mixture was further cooled to 100° F. Mixing by homogenizing by passage through said Charlotte mill was continued during the entire process including cooling. An excellent, smooth, semi-fluid (at room temperature) concentrate resulted.

*Preparation of finished lubricant.*—25 parts of the concentrate was mixed with 75 parts of additional mineral oil of 80 S.U.S. viscosity at 210° F. The resulting mixture was homogenized at room temperature by passage through said Charlotte mill to give a semi-fluid composition having a 40 base number.

*Comparison product A.*—68.1 parts mineral lubricating oil of 80 S.U.S. at 210° F., 10.2 parts hydrated lime and 4 parts of Wecoline AAC Acid were added and mixed in a steam heated kettle, after which 16 parts of glacial acetic acid was slowly added. The temperature was raised to 320° F. to evaporate water of reaction. The product was then cooled to 250° F., when 0.4 part of phenyl-alpha-naphthylamine was added. The product was then homogenized in said Charlotte mill.

Wecoline AAC Acid is a commercial fatty acid obtained from coconut oil and consists of about 46 wt. percent capric acid, about 28 wt. percent caprylic acid and about 26 wt. percent lauric acid.

EXAMPLE III 98 parts of Comparison Product A was mixed with 2 parts of the product of Example I. The resulting mixture was homogenized by passage through said Charlotte mill.

The formulations of the above compositions and their properties are summarized in Table I which follows:

TABLE I

| Examples | II | III | Comparison Product A |
|---|---|---|---|
| Formulation (parts by weight): | | | |
| Glacial Acetic Acid | 4.00 | 4.00 | 4.00 |
| Wecoline AAC Acid | | 1.00 | 1.00 |
| Tallow Fatty Acids | 0.65 | | |
| Product of Example I¹ | 0.75 | 2.00 | |
| Hydrated lime | 2.55 | 2.55 | 2.55 |
| Phenyl α-naphthylamine | 0.02 | 0.05 | 0.05 |
| Mineral Lubricating Oil, 80 S.U.S. at 210° F | 92.02 | 92.40 | 92.40 |
| Properties: | | | |
| Appearance | Excellent | Excellent | Excellent |
| S.S.U. visc./100° F | 1,604 | 1,649 | 1,650 |
| S.S.U. visc./210° F | 94.4 | 125 | 130 |
| Percent Ash (SO₄) | 4.9 | 4.9 | 5.1 |
| Centrifuge solids, vol. percent (1,500 r.p.m., 4 hours) | 0.05 | 0.4 | 0.8 |
| Filterability | Possible | Not possible | Not possible |
| Water Resistance | Excellent | Good | Poor |
| 4-Ball test, Scar diam., mm. (1,800 r.p.m., 10 kg., 75° C., 1 hr.) | 0.18 | 0.24 | 0.30 |
| 4-Hour Gel Test, 374° F | Fluid | Fluid | Gels |

¹ Oil solution of mylybdenum-containing phosphosulfurized polyisobutylene.

The Centrifuge Test was carried out in an ASTM centrifuge and the volume percent of separated material was reported.

The Filterability Test was carried out as follows:

50 grams of the composition being tested is mixed with 5 grams of diatomaceous earth filter aid and warmed to 200° F. while mixing. The hot mixture is then filtered through filter paper coated with diatomaceous earth filter aid using a Buchner funnel under reduced pressures.

Water resistance was determined by adding 0.2 wt. percent water to the test composition, mixing well and then subjecting the test composition again to the Centrifuge Test to determine if there was any substantial increase in centrifuge solids due to gelling caused by the water addition.

The 4-hour Gel Test was carried out by filling an ASTM pour point jar up to its mark, which is about ½ full, with the composition to be tested. The test composition is heated for four hours at 374° F. and is then allowed to cool for 45 minutes. The jar is then examined to see if the lubricant has gelled.

Upon comparing Example III with Comparison Product A, it is seen that merely adding the molybdenum-containing phosphosulfurized polyisobutene to Comparison Product A improved the water resistance from poor to good, while wear was reduced from an 0.30 mm. scar to a 0.24 mm. scar. Also, whereas Comparison Product A gelled in the Oven Test, the addition of the molybdenum containing material maintained the resulting composition of Example II. The table also shows that the Comparison Product A which represents the prior art, had gelled while the inventive compositions of Examples I and II had not. This gelling or lack of gelling is used as an indication of the spreading ability of the lubricant when it hits the hot cylinder it is being used to lubricate. This Gel Test is also an indication of the lubricant's tendency to remain fluid in long feed lines in hot locations.

Example II represents a more preferred form of the invention, wherein higher molecular weight unsaturated fatty acid is utilized in place of the intermediate molecular weight Wecoline AAC Acid and the molybdenum compound was present during the neutralization of the acetic and tallow acid with the lime. Thus, comparing the material of Example II with that of Example III, it is seen that Example II results in a lower viscosity, is even more impervious to water contamination as shown by its better water resistance, and results in a very low wear scar diameter of 0.18 mm., while maintaining its fluidity in the Gel Test.

EXAMPLE IV

A mineral lubricating oil of 150 S.U.S. viscosity at 210° F. was mixed with 0.5 weight percent of Lubrizol 92 additive which is a $P_2S_5$ treated α-pinene made by the Lubrizol Co., of Cleveland, Ohio, as a crankcase motor oil antioxidant for high temperature use. Then 0.41 wt. percent of the product of Example I was added in order to furnish 0.025 weight percent of molybdenum in the blend.

This blend was tested in the 4-Ball Wear Test under a load of 10 kilograms, at 1800 r.p.m. for 30 minutes. For comporison, the mineral oil per se was tested without the molybdenum compound.

The results obtained in the 4-Ball Wear Test are given in Table II.

TABLE II

| | Average wear scar diameter, mm. |
|---|---|
| Mineral oil | 0.497 |
| Mineral oil+product of Example I (0.025% Mo) +0.5% Lubrizol 92 | 0.300 |

The preceding table illustrates again the anti-wear properties of the molybdenum-containing product, since the Lubrizol 92 additive exerts no wear-reducing properties on the steel balls used in the 4-Ball Wear Test. Also, Table II illustrates the use of the molybdenum-containing material as a lubricating oil additive.

While the preceding examples have used $P_2S_5$ treated polyisobutylene dissolved in mineral oil to receive the molybdenum extract, the extract can be dissolved directly in the $P_2S_5$ treated polyisobutylene per se as the oil was only a diluent to reduce the viscosity of the phosphosulfurized polyisobutylene. Also, as previously indicated other phosphosulfurized hydrocarbons can be used. To illustrate Examples I to III can be repeated using a phosphosulfurized bright stock averaging about 600 molecular weight, for using a phosphosulfurized polyethylene of 1,000 molecular weight, etc.

What is claimed is:

1. A process for preparing a stable complex containing .1 to 10% molybdenum which comprises extracting a solution of a molybdenum compound selected from the group consisting of molybdic acid and molybdate salts with an extraction agent, adding the resulting extract to a phosphosulfurized hydrocarbon of 500 to 4,000 molecular weight Staudinger, and removing the extraction agent.

2. The product prepared by the process of claim 1.

3. A lubricant comprising a major proportion of lubricating oil and sufficient of the product of claim 2 to give a molybdenum content of about 0.01 to 1.0 wt. percent of said lubricant.

4. A process for preparing a stable complex containing molybdenum which comprises extracting an acidic aqueous solution of a molybdenum compound selected from the group consisting of molybdic acid and molybdate salts with an extraction agent selected from the group consisting of $C_3$ to $C_{16}$ ethers and $C_4$ to $C_{10}$ ketones, dispersing the resultant extract in a phosphosulfurized hydrocarbon having a molecular weight of 600 to 4,000, and then removing the extraction agent and water from the dispersion.

5. The product prepared by the process of claim 4.

6. A process as defined by claim 4, wherein said aqueous solution is acidified with HCl and has an acidity in the range from 4 N to 12 N.

7. A lubricating composition comprising a major amount of lubricating oil and alkaline earth metal salt of about 3 to 40 wt. percent fatty acid, said fatty acid being a mixture in a relative mole ratio of about 5 to 50 mole equivalent proportions of acetic acid per mole equivalent of $C_6$ to $C_{30}$ fatty acid, a molybdenum-containing phosphosulfurized polymer of a $C_2$ to $C_6$ monoolefin, said polymer having a molecular weight of about 600 to 4,000 Staudinger, in an amount sufficient to incorporate about 0.01 to 1.0 wt. percent molybdenum in said composition.

8. A lubricating composition according to claim 7, wherein said lubricating oil is mineral oil, said alkaline earth metal is calcium, and said $C_6$ to $C_{30}$ fatty acid is tallow fatty acid.

9. A lubricating oil composition comprising a major amount of mineral lubricating oil, calcium salt of about 3 to 10 wt. percent acetic acid and $C_{14}$ to $C_{30}$ fatty acid in a molar ratio of about 10 to 35 mole equivalent of acetic acid per mole of equivalent of $C_{14}$ to $C_{30}$ fatty acid, and a molybdenum-containing $P_2S_5$ treated polyisobutylene having a molecular weight of about 700 to 1,400 Staudinger in an amount sufficient to incorporate about 0.01 to 0.2 wt. percent molybdenum in said composition.

References Cited by the Examiner

UNITED STATES PATENTS

| 3,140,997 | 7/1964 | Price | 252—33 |
| 3,202,606 | 8/1965 | Morway et al. | 252—39 X |

DANIEL E. WYMAN, *Primary Examiner.*

I. VAUGHN, *Assistant Examiner.*